United States Patent
Jung et al.

(10) Patent No.: US 7,271,904 B2
(45) Date of Patent: Sep. 18, 2007

(54) SEAL DISPENSER FOR FABRICATING LIQUID CRYSTAL DISPLAY PANEL AND METHOD FOR DETECTING DISCONTINUOUS PORTION OF SEAL PATTERN USING THE SAME

(75) Inventors: Sung-Su Jung, Daegu-kwangyokshi (KR); Sang-Hyun Kim, Kyongsangbuk-do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 234 days.

(21) Appl. No.: 10/659,587

(22) Filed: Sep. 11, 2003

(65) Prior Publication Data

US 2004/0090589 A1    May 13, 2004

(30) Foreign Application Priority Data

Nov. 13, 2002    (KR)  .................... 10-2002-0070485

(51) Int. Cl.
  *G02F 1/13*    (2006.01)
  *G01N 21/61*   (2006.01)
  *B05D 1/02*    (2006.01)

(52) U.S. Cl. .................. 356/394; 118/668; 118/669; 118/180; 349/187; 427/8

(58) Field of Classification Search .. 356/237.1–237.6, 356/392–394; 118/665, 669–670, 680, 321, 118/410, 668; 427/258, 421; 349/190, 153, 349/110; 250/221, 208.1
  See application file for complete search history.

(56) References Cited

U.S. PATENT DOCUMENTS

| | | | |
|---|---|---|---|
| 3,978,580 A | 9/1976 | Leupp et al. | |
| 4,094,058 A | 6/1978 | Yasutake et al. | |
| 4,653,864 A | 3/1987 | Baron | |
| 4,691,995 A | 9/1987 | Yamazaki | |
| 4,775,225 A | 10/1988 | Tsuboyama | |
| 4,972,798 A * | 11/1990 | Ando et al. | 118/669 |
| 5,052,338 A * | 10/1991 | Maiorca et al. | 118/668 |
| 5,247,377 A | 9/1993 | Omeis | |
| 5,263,888 A | 11/1993 | Ishihara | |
| 5,379,139 A | 1/1995 | Sato | |
| 5,406,989 A * | 4/1995 | Abe | 141/7 |
| 5,415,693 A * | 5/1995 | Yoneda et al. | 118/664 |
| 5,437,727 A * | 8/1995 | Yoneda et al. | 118/669 |
| 5,499,128 A | 3/1996 | Hasegawa | |
| 5,507,323 A | 4/1996 | Abe | |

(Continued)

FOREIGN PATENT DOCUMENTS

EP    1 003 066 A1    5/2000

(Continued)

*Primary Examiner*—Sang H. Nguyen
(74) *Attorney, Agent, or Firm*—McKenna Long & Aldridge LLP

(57) ABSTRACT

A seal dispenser for fabricating a liquid crystal display panel and a method for detecting a discontinuous portion of a seal pattern using the same are disclosed in the present invention. The seal dispenser for fabricating a liquid crystal display panel includes a table holding a substrate, a syringe forming a seal pattern on the substrate by varying a position relation of the table, an image camera detecting an image of the seal pattern by varying the position of the table, and a display unit displaying an image of the seal pattern detected by the image camera.

16 Claims, 7 Drawing Sheets

U.S. PATENT DOCUMENTS

| | | |
|---|---|---|
| 5,511,591 A | 4/1996 | Abe |
| 5,539,545 A | 7/1996 | Shimizu |
| 5,548,429 A | 8/1996 | Tsujita |
| 5,642,214 A | 6/1997 | Ishii |
| 5,680,189 A | 10/1997 | Shimizu |
| 5,742,370 A | 4/1998 | Kim |
| 5,757,451 A | 5/1998 | Miyazaki |
| 5,852,484 A | 12/1998 | Inoue |
| 5,854,664 A | 12/1998 | Inoue |
| 5,861,932 A | 1/1999 | Inata |
| 5,875,922 A | 3/1999 | Chastine |
| 5,905,559 A * | 5/1999 | Fujiwara et al. ............ 349/190 |
| 5,906,682 A * | 5/1999 | Bouras et al. .............. 118/712 |
| 5,932,012 A * | 8/1999 | Ishida et al. ................ 118/669 |
| 5,952,676 A | 9/1999 | Sato |
| 5,956,112 A | 9/1999 | Fujimori |
| 6,001,203 A | 12/1999 | Yamada |
| 6,011,609 A | 1/2000 | Kato |
| 6,016,178 A | 1/2000 | Kataoka |
| 6,016,181 A | 1/2000 | Shimada |
| 6,055,035 A | 4/2000 | Von Gutfeld |
| 6,139,639 A * | 10/2000 | Kitamura et al. .......... 118/680 |
| 6,163,357 A | 12/2000 | Nakamura |
| 6,219,126 B1 | 4/2001 | Von Gutfeld |
| 6,226,067 B1 | 5/2001 | Nishiguchi |
| 6,236,445 B1 | 5/2001 | Foschaar |
| 6,304,306 B1 | 10/2001 | Shiomi |
| 6,304,311 B1 | 10/2001 | Egami |
| 6,337,730 B1 | 1/2002 | Ozaki |
| 6,340,644 B1 * | 1/2002 | Becker et al. .............. 438/782 |
| 6,414,733 B1 | 7/2002 | Ishikawa |
| 6,485,782 B2 * | 11/2002 | Takamori .................... 427/240 |
| 6,496,240 B1 * | 12/2002 | Zhang et al. ............... 349/116 |
| 6,541,757 B2 * | 4/2003 | Bieman et al. ............. 250/221 |
| 6,776,845 B2 * | 8/2004 | Minami et al. ............. 118/665 |
| 6,844,911 B2 * | 1/2005 | Lee ............................. 349/190 |
| 2002/0062787 A1 * | 5/2002 | Hashizume et al. ........ 118/664 |
| 2002/0089635 A1 * | 7/2002 | Matsumoto ................. 349/153 |
| 2004/0095526 A1 * | 5/2004 | Yamabuchi et al. .......... 349/96 |

FOREIGN PATENT DOCUMENTS

| | | |
|---|---|---|
| JP | 51-65656 | 6/1976 |
| JP | 57-038414 | 3/1982 |
| JP | 57-088428 | 6/1982 |
| JP | 58-027126 | 2/1983 |
| JP | 59-057221 | 4/1984 |
| JP | 59-195222 | 11/1984 |
| JP | 60-111221 | 6/1985 |
| JP | 60-164723 | 8/1985 |
| JP | 60-217343 | 10/1985 |
| JP | 61-007822 | 1/1986 |
| JP | 61-055625 | 3/1986 |
| JP | S62-054225 | 3/1987 |
| JP | S62-054228 | 3/1987 |
| JP | 62-089025 | 4/1987 |
| JP | 62-090622 | 4/1987 |
| JP | 62-205319 | 9/1987 |
| JP | 63-109413 | 5/1988 |
| JP | 63-110425 | 5/1988 |
| JP | 63-128315 | 5/1988 |
| JP | 63-311233 | 12/1988 |
| JP | H03-009549 | 1/1991 |
| JP | 05006913 A * | 1/1993 |
| JP | H05-036425 | 2/1993 |
| JP | H05-036426 | 2/1993 |
| JP | H05-107533 | 4/1993 |
| JP | 05-127179 | 5/1993 |
| JP | 05-154923 | 6/1993 |
| JP | 05-265011 | 10/1993 |
| JP | 05-281557 | 10/1993 |
| JP | 05-281562 | 10/1993 |
| JP | H06-018829 | 1/1994 |
| JP | 06-051256 | 2/1994 |
| JP | H06-064229 | 3/1994 |
| JP | 06-148657 | 5/1994 |
| JP | 06-160871 | 6/1994 |
| JP | H06-194637 | 7/1994 |
| JP | 06-235925 | 8/1994 |
| JP | 06-265915 | 9/1994 |
| JP | 06-313870 | 11/1994 |
| JP | 07-084268 | 3/1995 |
| JP | 07-128674 | 5/1995 |
| JP | 07-181507 | 7/1995 |
| JP | H07-275770 | 10/1995 |
| JP | H07-275771 | 10/1995 |
| JP | H08-076133 | 3/1996 |
| JP | 08-095066 | 4/1996 |
| JP | 08-101395 | 4/1996 |
| JP | 08-106101 | 4/1996 |
| JP | H08-110504 | 4/1996 |
| JP | H08-136937 | 5/1996 |
| JP | 08-171094 | 7/1996 |
| JP | 08-190099 | 7/1996 |
| JP | H08-173874 | 7/1996 |
| JP | 08-240807 | 9/1996 |
| JP | 08-304796 | 11/1996 |
| JP | 09-005762 | 1/1997 |
| JP | 09-026578 | 1/1997 |
| JP | H09-001026 | 1/1997 |
| JP | 09-311340 | 2/1997 |
| JP | 09-61829 | 3/1997 |
| JP | 09-073075 | 3/1997 |
| JP | 09-073096 | 3/1997 |
| JP | H09-094500 | 4/1997 |
| JP | 09-127528 | 5/1997 |
| JP | 09-230357 | 9/1997 |
| JP | 09-281511 | 10/1997 |
| JP | 10-123537 | 5/1998 |
| JP | 10-123538 | 5/1998 |
| JP | 10-142616 | 5/1998 |
| JP | 10-177178 | 6/1998 |
| JP | H10-174924 | 6/1998 |
| JP | 10199903 A * | 7/1998 |
| JP | 10-221700 | 8/1998 |
| JP | 10-282512 | 10/1998 |
| JP | 10-333157 | 12/1998 |
| JP | 10-333159 | 12/1998 |
| JP | 11-014953 | 1/1999 |
| JP | 11-038424 | 2/1999 |
| JP | 11-064811 | 3/1999 |
| JP | 11-109388 | 4/1999 |
| JP | 11-119232 | 4/1999 |
| JP | 11-133438 | 5/1999 |
| JP | 11-142864 | 5/1999 |
| JP | 11-174477 | 7/1999 |
| JP | 11-212045 | 8/1999 |
| JP | 11-248930 | 9/1999 |
| JP | H11-262712 | 9/1999 |
| JP | H11-264991 | 9/1999 |
| JP | 11-326922 | 11/1999 |
| JP | 11-344714 | 12/1999 |
| JP | 2000-002879 | 1/2000 |
| JP | 2000-029035 | 1/2000 |
| JP | 2000-056311 | 2/2000 |
| JP | 2000-066165 | 3/2000 |
| JP | 2000-066218 | 3/2000 |
| JP | 2000-093866 | 4/2000 |
| JP | 2000-137235 | 5/2000 |
| JP | 2000-147528 | 5/2000 |
| JP | 2000-193988 | 7/2000 |
| JP | 2000-241824 | 9/2000 |
| JP | 2000-284295 | 10/2000 |
| JP | 2000-292799 | 10/2000 |

| | | | | | |
|---|---|---|---|---|---|
| JP | 2000-310759 | 11/2000 | JP | 2002-079160 | 3/2002 |
| JP | 2000-310784 | 11/2000 | JP | 2002-080321 | 3/2002 |
| JP | 2000-338501 | 12/2000 | JP | 2002-082340 | 3/2002 |
| JP | 2001-005401 | 1/2001 | JP | 2002-090759 | 3/2002 |
| JP | 2001-005405 | 1/2001 | JP | 2002-090760 | 3/2002 |
| JP | 2001-013506 | 1/2001 | JP | 2002-107740 | 4/2002 |
| JP | 2001-033793 | 2/2001 | JP | 2002-122870 | 4/2002 |
| JP | 2001-042341 | 2/2001 | JP | 2002-122872 | 4/2002 |
| JP | 2001-051284 | 2/2001 | JP | 2002-122873 | 4/2002 |
| JP | 2001-066615 | 3/2001 | JP | 2002-131762 | 5/2002 |
| JP | 2001-091727 | 4/2001 | JP | 2002-139734 | 5/2002 |
| JP | 2001-117105 | 4/2001 | JP | 2002-156518 | 5/2002 |
| JP | 2001-117109 | 4/2001 | JP | 2002-169166 | 6/2002 |
| JP | 2001-133745 | 5/2001 | JP | 2002-169167 | 6/2002 |
| JP | 2001-133794 | 5/2001 | JP | 2002-182222 | 6/2002 |
| JP | 2001-133799 | 5/2001 | JP | 2002-202512 | 7/2002 |
| JP | 2001-142074 | 5/2001 | JP | 2002-202514 | 7/2002 |
| JP | 2001-147437 | 5/2001 | JP | 2002-214626 | 7/2002 |
| JP | 2001-154211 | 6/2001 | JP | 2002-229042 | 8/2002 |
| JP | 2001-166272 | 6/2001 | JP | 2002-236276 | 8/2002 |
| JP | 2001-166310 | 6/2001 | JP | 2002-258299 | 8/2002 |
| JP | 2001-176897 A | 6/2001 | JP | 2002-236292 | 9/2002 |
| JP | 2001-183683 | 7/2001 | JP | 2002-277865 | 9/2002 |
| JP | 2001-201750 | 7/2001 | JP | 2002-277866 | 9/2002 |
| JP | 2001-209052 | 8/2001 | JP | 2002-277881 | 9/2002 |
| JP | 2001-209056 | 8/2001 | JP | 2002-287156 | 10/2002 |
| JP | 2001-209057 | 8/2001 | JP | 2002-296605 | 10/2002 |
| JP | 2001-209058 | 8/2001 | JP | 2002-311438 | 10/2002 |
| JP | 2001-209060 | 8/2001 | JP | 2002-311440 | 10/2002 |
| JP | 2001-215459 | 8/2001 | JP | 2002-311442 | 10/2002 |
| JP | 2001-222017 | 8/2001 | JP | 2002-323687 | 11/2002 |
| JP | 2001-235758 | 8/2001 | JP | 2002-323694 | 11/2002 |
| JP | 2001-255542 | 9/2001 | JP | 2002-333628 | 11/2002 |
| JP | 2001-264782 | 9/2001 | JP | 2002-333635 | 11/2002 |
| JP | 2001-272640 | 10/2001 | JP | 2002-333843 | 11/2002 |
| JP | 2001-281675 | 10/2001 | JP | 2002-341329 | 11/2002 |
| JP | 2001-281678 | 10/2001 | JP | 2002-341355 | 11/2002 |
| JP | 2001-282126 | 10/2001 | JP | 2002-341356 | 11/2002 |
| JP | 2001-305563 | 10/2001 | JP | 2002-341357 | 11/2002 |
| JP | 2001-330837 | 11/2001 | JP | 2002-341358 | 11/2002 |
| JP | 2001-330840 | 11/2001 | JP | 2002-341359 | 11/2002 |
| JP | 2001-356353 | 12/2001 | JP | 2002-341362 | 11/2002 |
| JP | 2001-356354 | 12/2001 | KR | 1996-0040097 | 11/1996 |
| JP | 2002-014360 | 1/2002 | KR | 2000-0035302 | 6/2000 |
| JP | 2002-023176 | 1/2002 | | | |
| JP | 2002-049045 | 2/2002 | * cited by examiner | | |

SEAL DISPENSER FOR FABRICATING LIQUID CRYSTAL DISPLAY PANEL AND METHOD FOR DETECTING DISCONTINUOUS PORTION OF SEAL PATTERN USING THE SAME

This application claims the benefit of the Korean Application No. P2002-070485 filed on Nov. 13, 2002, which is hereby incorporated by reference.

BACKGROUND OF THE INVENTION

1. Field of the Invention

The present invention relates to a liquid crystal display panel, and more particularly, to a seal dispenser for fabricating a liquid crystal display panel and a method for detecting a discontinuous portion of a seal pattern using the same.

2. Discussion of the Related Art

In general, a liquid crystal display panel is a display device where data signals including picture information are individually supplied to liquid crystal cells arranged in a matrix form, and the light transmittance of the liquid crystal cells is controlled to display a desired picture. Thus, the liquid crystal display device includes a liquid crystal display panel, and a driver integrated circuit (IC) for driving the liquid crystal cells. The liquid crystal cells are arranged in a unit pixel in a matrix form.

The liquid crystal display panel includes a color filter substrate and a thin film transistor array substrate facing into each other. The liquid crystal display panel further includes a liquid crystal layer between the color filter substrate and the thin film transistor array substrate.

Data lines and gate lines are formed on the thin film transistor array substrate of the liquid crystal display panel, and intersect one another at right angles, so that liquid crystal cells are defined at each intersection. The data lines transmit a data signal supplied from the data driver integrated circuit to the liquid crystal cells, and the gate lines transmit a scan signal supplied from the gate driver integrated circuit to the liquid crystal cells. At one portion of the data lines and the gate lines, a data pad and a gate pad are provided in which data signals and scan signals are applied from the data driver integrated circuit and the gate driver integrated circuit.

The gate driver integrated circuit sequentially supplies the scan signal to the gate lines so that the liquid crystal cells arranged in a matrix form may be sequentially selected line by line, and the data signal is supplied to the selected one line of the liquid crystal cells from the data driver integrated circuit.

A common electrode and a pixel electrode are formed at the inner side of the color filter substrate and the thin film transistor array substrate, and apply an electric field to the liquid crystal layer. The pixel electrode is formed at each liquid crystal cell on the thin film transistor array substrate, while the common electrode is integrally formed at the entire surface of the color filter substrate. Therefore, by controlling a voltage applied to the pixel electrode in a state where a voltage is applied to the common electrode, the light transmittance of the liquid crystal cells may be individually controlled.

In order to control the voltage applied to the pixel electrode by liquid crystal cells, a thin film transistor used as a switching device is formed at each liquid crystal cell.

Elements of the liquid crystal display device will now be described.

FIG. 1 is a plane view of a unit liquid crystal display panel having a thin film transistor array substrate and a color filter substrate according to the related art.

In FIG. 1, a liquid crystal display panel 100 includes an image display part 113 where liquid crystal cells are arranged in a matrix form, a gate pad part 114 connected to the gate lines of the image display part 113, and a data pad part 115 connected to the data lines of the image display part 113. The gate pad part 114 and the data pad part 115 are formed along the edge region of the thin film transistor array substrate 101 that does not overlap the color filter substrate 102. The gate pad part 114 supplies a scan signal from the gate driver integrated circuit to the gate lines of the image display part 113, and the data pad part 115 supplies image information from the data driver integrated circuit to the data lines of the image display part 113.

The data lines to which image information is applied and the gate lines to which a scan signal is applied intersect one another. A thin film transistor for switching the liquid crystal cells, a pixel electrode for driving the liquid crystal cells by connecting the thin film transistor, and a passivation layer formed at the entire surface to protect the electrodes and the thin film transistor are provided at the intersections.

Color filters formed at the cell regions separated by the black matrix and a common transparent electrode facing into the pixel electrode formed on the thin film transistor array substrate 101 are provided at the color filter substrate 102 of the image display part 113. A cell gap is formed by a spacer between the thin film transistor array substrate 101 and the color filter substrate 102, and the substrates are attached to each other by a seal pattern 116 formed along the outer edge of the image display part 113, thereby forming a unit liquid crystal display panel.

In fabricating a unit liquid crystal display panel, a plurality of unit liquid crystal display panels are simultaneously formed on a large-scale mother substrate. Thus, it requires a process for separating the unit liquid crystal display panels from the large-scale mother substrate by cutting and processing the mother substrate with the plurality of liquid crystal display panels formed thereon.

As for the unit liquid crystal display panel separated from the large-scale mother substrate, liquid crystal is injected through a liquid crystal injection hole to form a liquid crystal layer at the cell gap that separates the thin film transistor array substrate 101 and the color filter substrate 102, and then the liquid crystal injection hole is sealed.

As mentioned above, in order to fabricate a unit liquid crystal display panel, the processes described below are generally required. The thin film transistor array substrate 101 and the color filter substrate 102 are separately fabricated and attached to each other, such that a uniform cell gap is maintained therebetween. And, the attached substrates are cut into unit liquid crystal display panels, then a liquid crystal is injected into the cell gap of the unit liquid crystal display panel.

Especially, the process of forming the seal pattern 116 along the outer edge of the image display part 113 is required to attach the thin film transistor array substrate 101 and the color filter substrate 102. A method of forming a seal pattern according to the related art will now be described as follows.

FIGS. 2A and 2B illustrate a formation of a seal pattern by a screen printing process according to the related art.

As shown in FIGS. 2A and 2B, a patterned screen mask 206 is provided so that a seal pattern forming region is selectively exposed. A rubber squeegee 208 is provided for selectively supplying a sealant 203 to a substrate 200 through the screen mask 206 to form a seal pattern 216.

The seal pattern 216 formed on the substrate 200 is to be used for a cell gap to which liquid crystal is injected, and prevents leakage of the injected liquid crystal. Thus, the seal pattern 216 is formed along the outer edge of the image display part 213 of the substrate 200, and a liquid crystal injection hole is formed at one side of the seal pattern 216.

The screen printing method includes applying the sealant 203 on the screen mask 206 with a seal pattern forming region patterned thereon, forming the seal pattern 216 on the substrate 200 through printing with the rubber squeegee 208, drying the seal pattern 216 by evaporating a solvent contained in the seal pattern 216, and leveling the seal pattern 216.

The screen printing method is widely used due to an advantage in convenience in the process. However, it is disadvantageous in that the sealant 203 is much consumed as the sealant 203 is applied at the entire surface of the screen mask 206 and printed with the rubber squeegee 208 to form the seal pattern 216.

In addition, the screen printing method has a problem that the rubbing process of an alignment layer (not shown) formed on the substrate 200 is defective as the screen mask 206 and the substrate 200 are in contact with each other, thereby degrading a picture quality of the liquid crystal display device.

Therefore, in order to complement the shortcomings of the screen printing method, a seal dispensing method has been proposed.

FIG. 3 is a schematic view illustrating a dispensing method for forming a seal pattern according to the related art.

As shown in FIG. 3, a table 310 with a substrate 300 loaded thereon is moved in forward/backward and left/right directions. At the same time, a seal pattern 316 is formed along the outer edge of an image display part 313 of the substrate 300 by applying a pressure to a syringe 301 filled with a sealant.

In the seal dispensing method, as a sealant is selectively supplied to the region where the seal pattern 316 is to be formed, the sealant consumption may be reduced. In addition, since the syringe is not in contact with an alignment layer (not shown) of the image display part of the substrate 300, the rubbed alignment layer would not be damaged and thus a picture quality of the liquid crystal display device may be improved.

After the seal pattern 316 is formed on the substrate 300, if the substrate 300 is found defective by detecting a discontinuous portion, the substrate 300 should be discarded.

In the related art, the detection of a discontinuous portion of the seal pattern is performed by the naked eyes of an operator. That is, when the seal pattern 316 is formed on the substrate 300, the operator has to open the equipment to check whether there is a discontinuous portion of the seal pattern 316 with the naked eyes.

However, in such a case, as the equipment is opened and the operator comes in and out to the equipment, an undesirable material can be adsorbed on the substrate 300, thereby causing a deficiency in the liquid crystal display panel.

In addition, since the operator performs the detection of a discontinuous portion of the seal pattern 316 with the naked eyes, the reliability of the checking can be degraded. In other words, even if the seal pattern 316 is defective, a later process can be carried out on the substrate 300. Then, the liquid crystal display panel of a complete product should be discarded at the final detection, thereby causing a waste of material.

In addition, since the operator performs the detection of a discontinuous portion of the seal pattern 316 by the naked eyes, it takes too much time to detect the defective portion, which would degrade the productivity of a product.

SUMMARY OF THE INVENTION

Accordingly, the present invention is directed to a seal dispenser for fabricating a liquid crystal display panel and a method for detecting a discontinuous portion of a seal pattern using the same that substantially obviate one or more of problems due to limitations and disadvantages of the related art.

Another object of the present invention is to provide a seal dispenser for fabricating a liquid crystal display panel and a method for detecting a discontinuous portion of a seal pattern using the same that are capable of checking a discontinuous portion of a seal pattern formed on a substrate through an image camera driven along the same driving path as that of a seal dispenser.

Additional features and advantages of the invention will be set forth in the description which follows and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a seal dispenser for fabricating a liquid crystal display panel includes a table holding a substrate, a syringe forming a seal pattern on the substrate by varying a position relation of the table, an image camera detecting an image of the seal pattern by varying the position of the table, and a display unit displaying an image of the seal pattern detected by the image camera.

In another aspect of the present invention, a method for detecting a discontinuous portion of a seal pattern of a liquid crystal display panel includes loading a substrate, forming a seal pattern on the substrate by varying a relative position between the substrate and a syringe, aligning a start point of the seal pattern and an image camera, detecting an image of the seal pattern by changing the relative position between the image camera and the substrate, displaying the image of the seal pattern, and determining whether the seal pattern has a discontinuous portion by investigating the displayed image of the seal pattern.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention.

In the drawings.

DETAILED DESCRIPTION OF THE ILLUSTRATED EMBODIMENTS

Reference will now be made in detail to the illustrated embodiments of the present invention, examples of which are illustrated in the accompanying drawings. Wherever possible, the same reference numbers will be used throughout the drawings to refer to the same or like parts.

Figure 1:
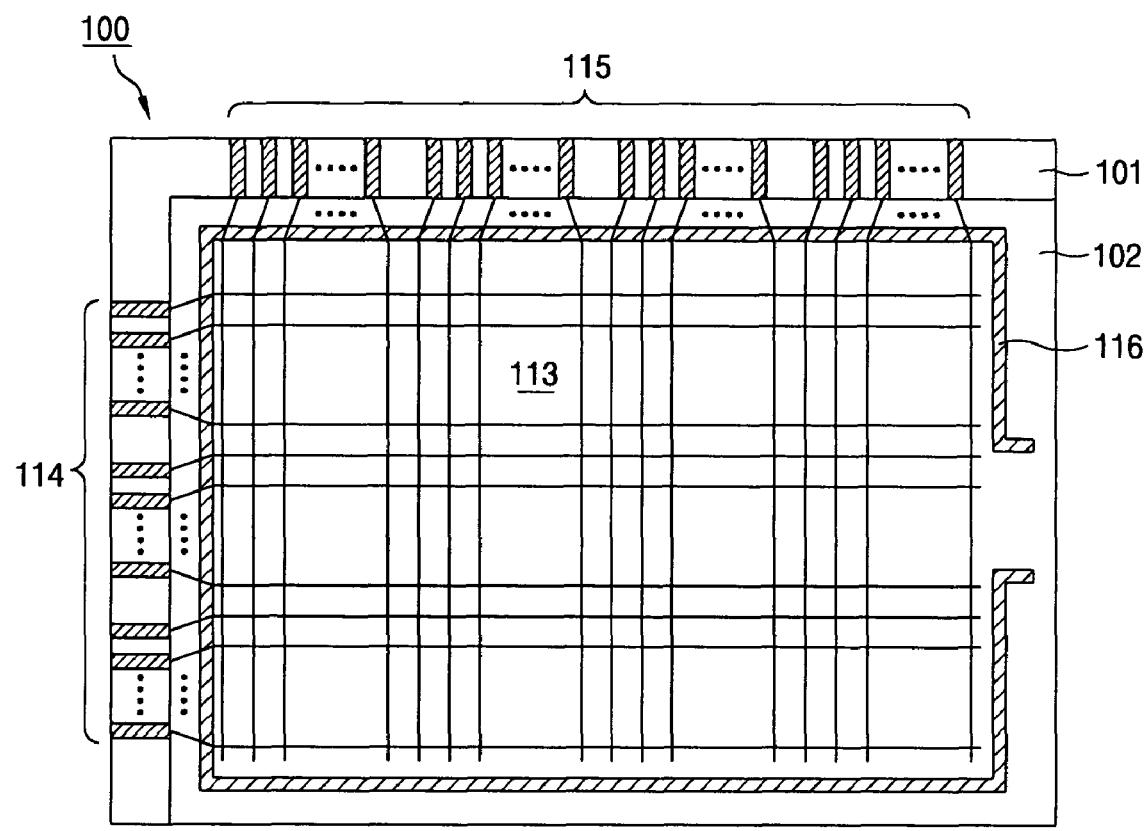
FIG. 1 is a plane view of a unit liquid crystal display panel having a thin film transistor array substrate and a color filter substrate according to the related art.
Figure 2A:
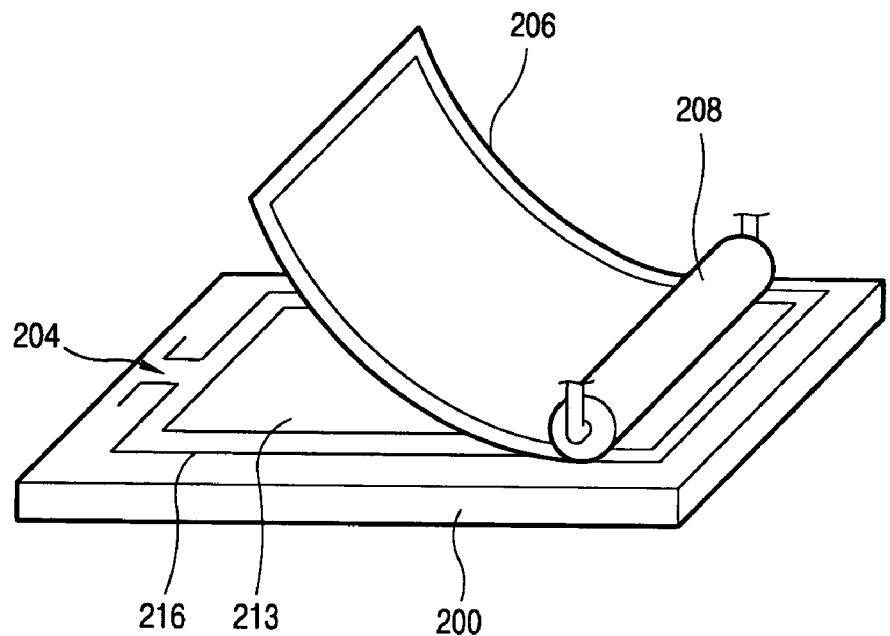
FIGS. 2A and 2B illustrate a formation of a seal pattern by a screen printing process according to the related art.
Figure 2B:
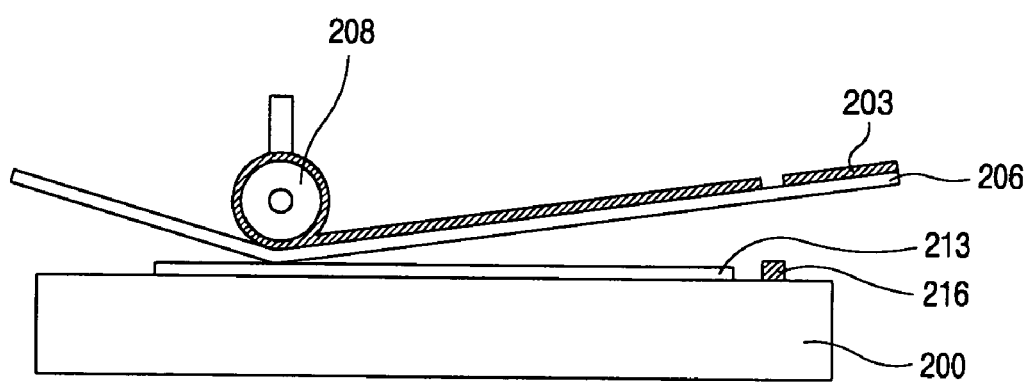
Figure 3:
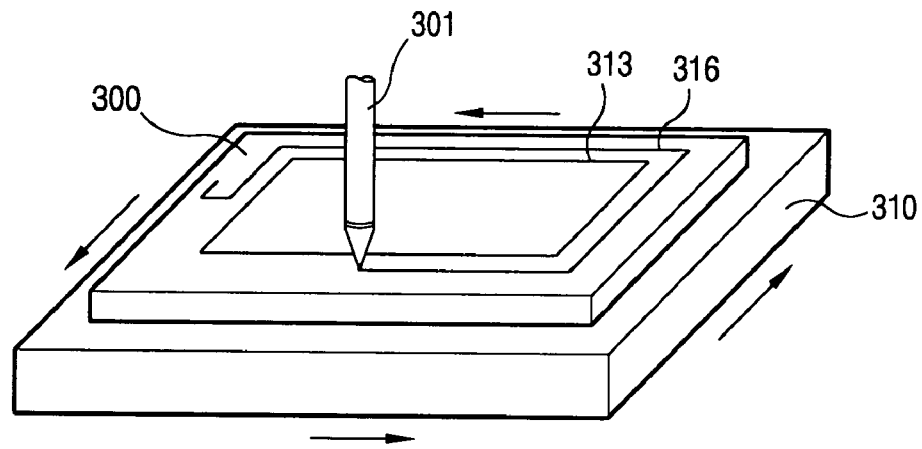
FIG. 3 is a schematic view illustrating a dispensing method for forming a seal pattern according to the related art.
Figure 4:
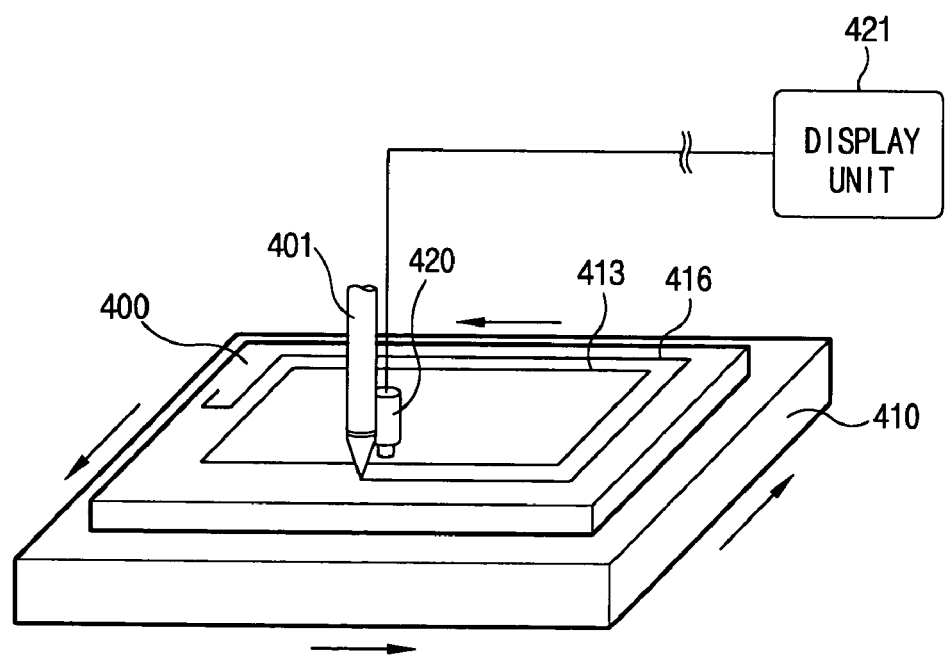
FIG. 4 illustrates a seal dispenser for fabricating a liquid crystal display panel according to a first embodiment of the present invention.

FIG. 4 illustrates a seal dispenser for fabricating a liquid crystal display panel according to a first embodiment of the present invention.

As shown in FIG. 4, a seal dispenser according to the first embodiment of the present invention includes a table 410 on which a substrate 400 is loaded, a syringe 401 for forming a seal pattern 416 at the outer edge of an image display part 413 of the substrate 400 by changing a relative position between the syringe 401 and the table 410, an image camera 420 for detecting an image of the seal pattern 416 formed on the substrate 400 by changing a relative position between the image camera 420 and the table 410, and a display unit 421 for displaying an image of the seal pattern 416 detected by the image camera 420.

Figure 5:
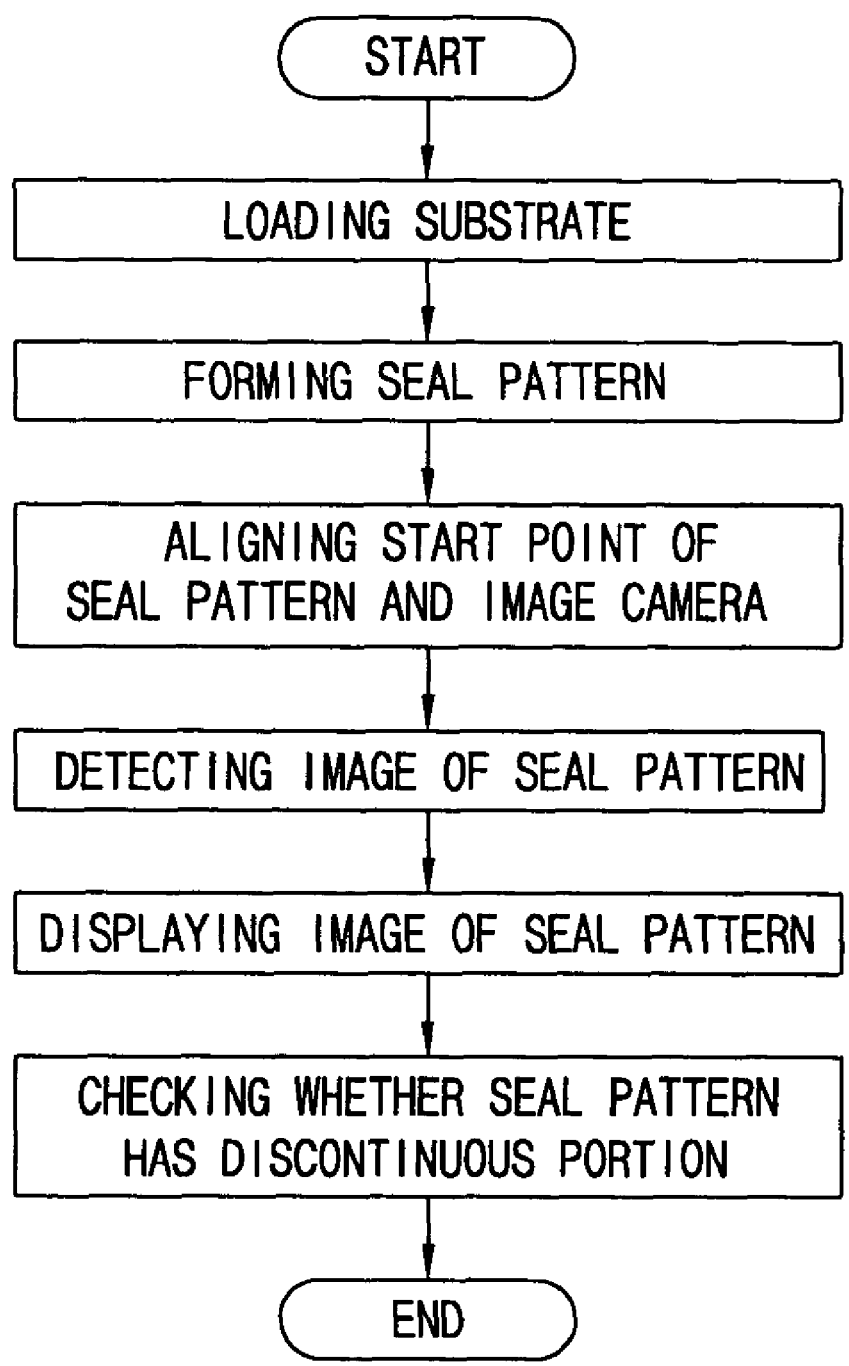
FIG. 5 is a flow chart of a method for detecting a discontinuous portion of a seal pattern using the seal dispenser of FIG. 4.

FIG. 5 is a flow chart of a method for detecting a discontinuous portion of a seal pattern using the seal dispenser of FIG. 4.

As shown in FIG. 5, a method for detecting a discontinuous portion for fabricating a seal pattern using a seal dispenser of a liquid crystal display panel according to the first embodiment of the present invention includes loading the substrate 400 on the table 410, forming the seal pattern 416 at the outer edge of the image display part 413 of the substrate 400 by changing a relative position between the table 410 and the syringe 401, aligning a start point of the seal pattern 416 and the image camera 420, detecting an image of the seal pattern 416 by changing the relative position between the table 410 and the image camera 420, displaying the image of the seal pattern 416 detected by the image camera 420 on the display unit 421, and checking whether the seal pattern 416 has a discontinuous portion by investigating the image of the seal pattern 416 displayed on the display unit 421.

The substrate 400 may be a large-scale mother substrate formed of glass with a plurality of thin film transistor array substrates formed thereon or a large-scale mother substrate formed of glass with a plurality color filter substrates formed thereon.

Either the syringe 401 discharging a sealant or the table 410 with the substrate 400 loaded thereon is horizontally moved to change the relative position, in order to form the seal pattern 416 at the outer edge of the image display part 413.

At this time, when the syringe 401 is moved, an undesirable material may be adsorbed on the substrate 400 when the dispenser is driven to move because the syringe 401 is attached to the dispenser.

Thus, the seal pattern 416 can be formed by horizontally moving the table 410 with the loaded substrate 400 in forward/backward and left/right directions.

Either the table 410 with the loaded substrate 400 or the image camera 420 detecting an image of the seal pattern can be horizontally moved to change their relative position in order to align the image camera 420 and the start point of the seal pattern 416, and then an image of the seal pattern 416 is detected.

At this time, since the image camera 420 is mounted at the side of the syringe 401, if the image camera 420 is moved, an undesirable material may be adsorbed on the substrate 400 due to the driving of the dispenser.

Therefore, the table 410 with the loaded substrate 400 can be horizontally moved in forward/backward and left/right directions to align the image camera 420 and the start point of the seal pattern 416 and to detect an image of the seal pattern 416.

The seal dispenser of the liquid crystal display panel and the method for detecting a discontinuous portion of a seal pattern using the same according to the first embodiment of the present invention will now be explained as follows.

First, the table 410 is horizontally moved in forward/backward and left/right directions to align the image camera 420 to the start point of the seal pattern 416, and then the table 410 is horizontally moved again in the forward/backward and left/right directions to detect an image of the seal pattern 416 formed on the substrate 400 by the image camera 420.

Thus, the table 410 with the loaded substrate 400 is moved in the same path as that of forming the seal pattern 416 by the syringe 401 and as that of detecting an image of the seal pattern 416 by the image camera 420.

The image of the seal pattern 416 detected by the image camera 420 is enlarged to be displayed by the display unit 421. Then, the operator can check whether the seal pattern 416 has a discontinuous portion by investigating the enlarged image of the seal pattern 416.

The seal pattern 416 may be formed of various shapes depending on a method for forming the liquid crystal layer on the liquid crystal display panel. The method for forming the liquid crystal layer on the liquid crystal display panel may be divided into a vacuum injection method and a dropping method.

The vacuum injection method is that a liquid crystal injection hole of a unit liquid crystal display panel separated from a large-scale mother substrate is dipped in a container filled with the liquid crystal in a vacuum chamber, and then the liquid crystal is injected into the liquid crystal display panel by a pressure difference between the inner side and the outer side of the liquid crystal display panel by varying a degree of vacuum. After the liquid crystal is filled in the liquid crystal display panel, the liquid crystal injection hole is sealed to form a liquid crystal layer of the liquid crystal display panel.

The liquid crystal injection hole in the vacuum injection method is defined as an open region of one side of the seal pattern 416. Accordingly, in case of forming a liquid crystal layer on the liquid crystal display panel through the vacuum injection method, as shown in FIG. 4, a portion of the seal pattern 416 is formed to be open so that it functions as a liquid crystal injection hole.

However, the vacuum injection method as described above has the following problems.

In the vacuum injection method, it takes a long time to fill the liquid crystal in the liquid crystal display panel. In general, the attached liquid crystal display panel with an area of several hundreds square-centimeters (cm$^2$) has a cell gap of a few micrometers (μm). Thus, even with the vacuum injection method which uses a pressure difference, an injecting amount of the liquid crystal by unit time is quite small.

For instance, in case of fabricating a liquid crystal display panel of about 15 inches, about 8 hours are required to fill the liquid crystal. Thus, with such a long time taken for fabricating the liquid crystal display panel, the productivity is reduced.

In addition, as the liquid crystal display panel becomes large in size, the time required to fill the liquid crystal is accordingly lengthened and the deficiency in filling the liquid crystal may occur. Therefore, the vacuum injection method cannot be used for a large-scale liquid crystal display panel.

In addition, liquid crystal is much consumed in the vacuum injection method. In general, an actual injected amount of the liquid crystal is very small compared to the amount of the liquid crystal filled in the container, and when liquid crystal is exposed to the air or a specific gas, it reacts with the gas and becomes degraded. Thus, even if the liquid crystal filled in the container is filled to a plurality of liquid crystal display panels, a large amount of the liquid crystal still remaining after the filling process and such remaining liquid crystal is discarded. As a result, a unit price of the liquid crystal display is increased.

In order to overcome such problems of the vacuum injection method, recently, a dropping method is adopted.

The dropping method is that the liquid crystal is dropped and dispensed on a plurality of thin film transistor array substrates fabricated on one large-scale mother substrate or on color filter substrates fabricated on another large-scale mother substrate, and then the two mother substrates are attached to each other, so that the liquid crystal is uniformly distributed at the entire image display regions by the pressure generated when the two mother substrates are attached to each other, thereby forming a liquid crystal layer.

In case of forming the liquid crystal layer on the liquid crystal display panel through the dropping method, the liquid crystal is not filled from the outside but directly dropped on the substrate. Thus, the seal pattern 416 is formed to have a rectangular shape to encompass the outer edge of the image display part in order to prevent an external leakage of the liquid crystal from the image display part.

In the dropping method, the liquid crystal may be dropped within a short time compared to the vacuum injection method. Thus, for a large-sized liquid crystal display panel, a liquid crystal layer can be quickly formed between the substrates.

In addition, since only a required amount of the liquid crystal is dropped on the substrate, the unit price of the liquid crystal display panel as in the vacuum injection method can be kept low.

Unlike the vacuum injection method, unit liquid crystal display panels are separated from the large-scale mother substrate after the liquid crystal layer is formed in the dropping method.

Figure 6:
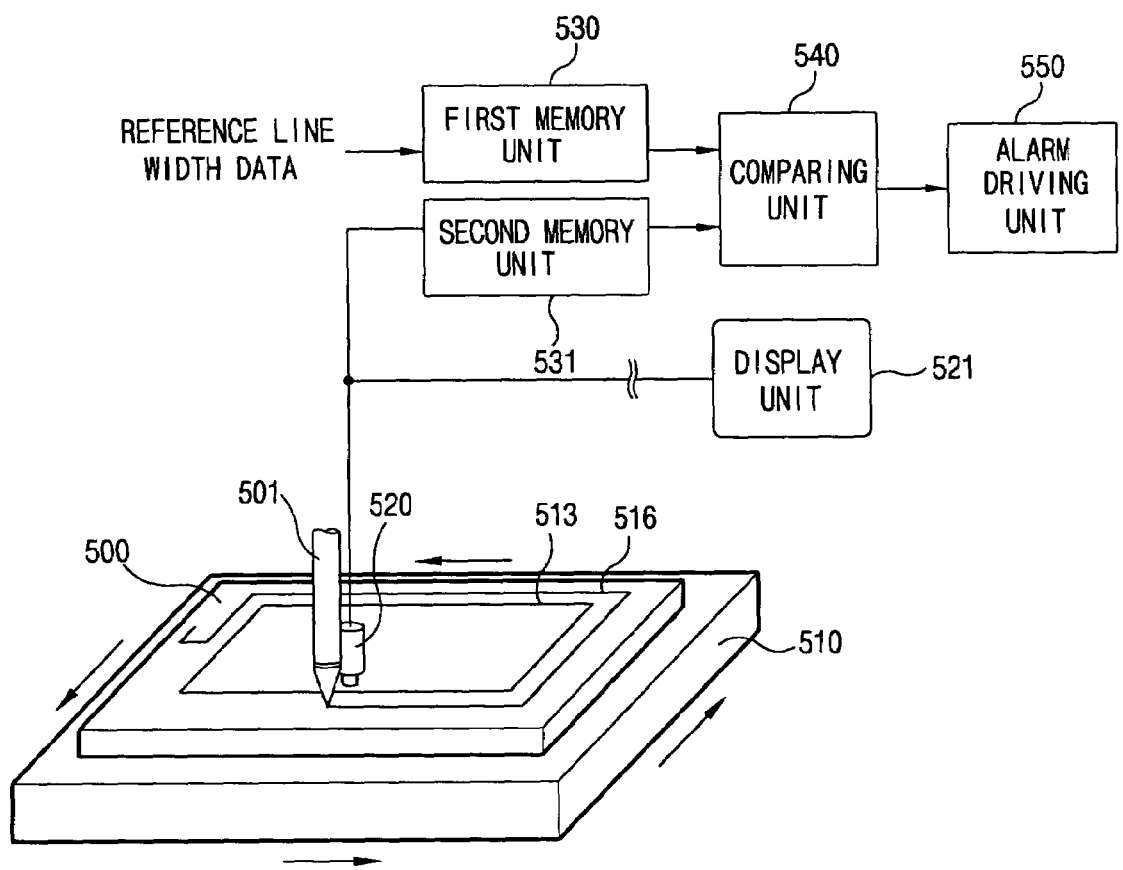
FIG. 6 illustrates a seal dispenser for fabricating a liquid crystal display panel according to a second embodiment of the present invention.

FIG. 6 illustrates a seal dispenser for fabricating a liquid crystal display panel according to a second embodiment of the present invention.

As shown in FIG. 6, a seal dispenser for fabricating a liquid crystal display panel according to the second embodiment of the present invention includes a table 510 on which a substrate 500 is loaded, a syringe 501 for forming a seal pattern 516 at the outer edge of an image display part 513 of the substrate 500 by changing its relative position to the table 510, an image camera 520 for detecting an image of the seal pattern 516 formed on the substrate 500 by changing its relative position to the table 510, a display unit 521 for displaying the image of the seal pattern 516 detected by the image camera 520, a first memory unit 530 for receiving and storing a reference line width of the seal pattern 516 by the operator, a second memory unit 531 for receiving and storing an actual line width data of the seal pattern 516 detected by the image camera 520, a comparing unit 540 for comparing the data stored in the first and second memory units 530 and 531 and outputting a control signal when an error exceeds a tolerance limit, and an alarm driving unit 550 for generating an alarm upon receiving the control signal of the comparing unit 540.

Figure 7:
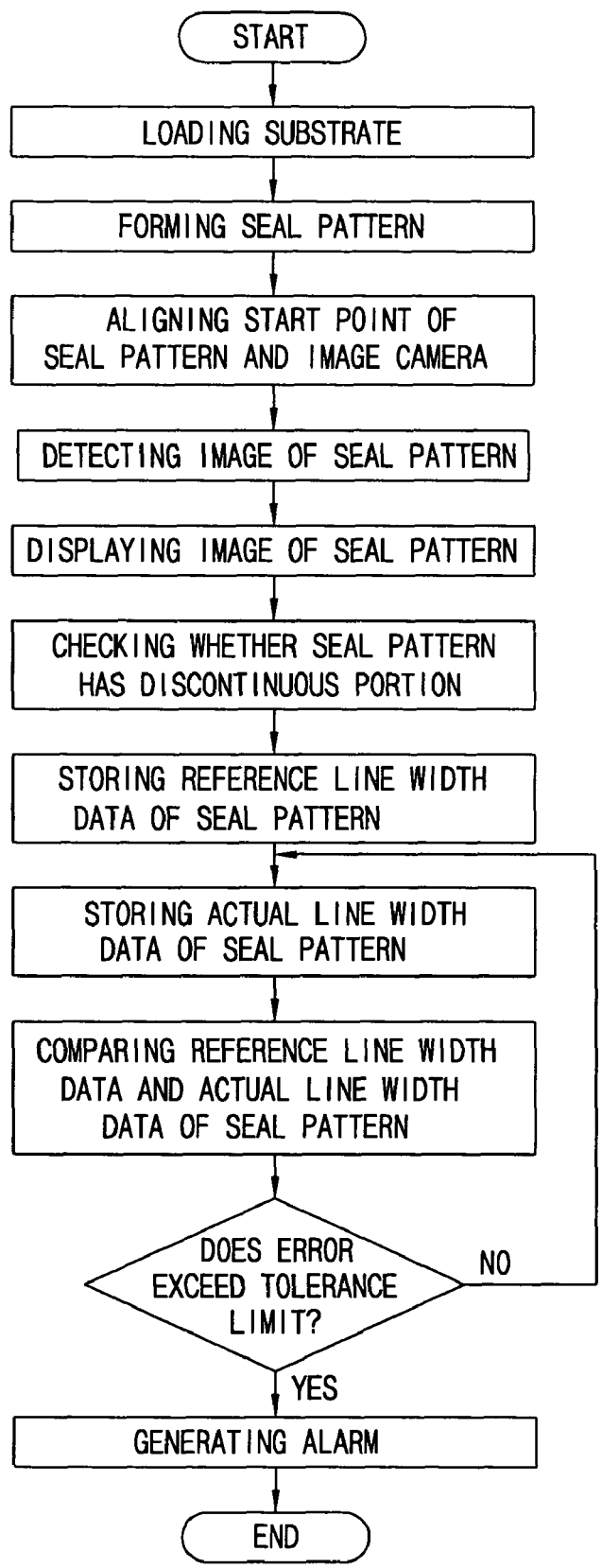
FIG. 7 is a flow chart of a method for detecting a discontinuous portion of a seal pattern using the seal dispenser of FIG. 6.

FIG. 7 is a flow chart of a method for detecting a discontinuous portion of a seal pattern using the seal dispenser of FIG. 6.

As shown in FIG. 7, a method for detecting a discontinuous portion of a seal pattern using the seal dispenser according to the second embodiment of the present invention includes loading the substrate 500 on the table 510, forming the seal pattern 516 at the outer edge of the image display part 513 of the substrate 500 by changing a relative position between the table 510 and the syringe 501, aligning the start point of the seal pattern 516 and the image camera 520, displaying the image of the seal pattern 516 detected by the image camera 520 on the display unit 521, determining whether the seal pattern 516 has a discontinuous portion by investigating the image of the seal pattern 516 displayed on the display unit 521, storing the reference line width data of the seal pattern 516 in the first memory unit 530, storing the actual line width data of the seal pattern 516 detected by the image camera 520 in the second memory unit 531, comparing the reference line width data and the actual line width data of the seal pattern 516 by the comparing unit 540 and determining whether an error exceeds a tolerance limit, and generating an alarm by an alarm driving unit 550 when an error exceeds a tolerance limit.

The substrate 500 can be a large-scale mother substrate made of glass including a plurality of thin film transistor array substrates formed thereon or a large-scale mother substrate made of glass including a plurality of color filter substrates formed thereon.

Either the table 510 on which the substrate is loaded or the syringe 501 for discharging a sealant is horizontally moved to change their relative position, thereby forming the seal pattern 516 at the outer edge of the image display part 513.

At this time, when the syringe 501 is moved, an undesirable material may be adsorbed on the substrate 500 due to the driving of the dispenser with the syringe 501 mounted at the side.

Thus, the seal pattern 516 may be formed by horizontally moving the table 510 with the loaded substrate 500 in forward/backward and left/right directions.

Either the table 510 with the loaded substrate 500 or the image camera 520 detecting an image of the seal pattern is horizontally moved to change their relative position in order to align the image camera 520 and the start point of the seal pattern 416, and then an image of the seal pattern 516 is detected.

At this time, since the image camera 520 is mounted at the side of the syringe 501, if the image camera 520 is moved, an undesirable material may be generated when the dispenser is driven, and adsorbed on the substrate 500 like the case of moving the syringe 501.

Therefore, the table 510 with the loaded substrate 500 may be horizontally moved in a forward/backward and left/right directions to align the image camera 520 and the start point of the seal pattern 516 and detect an image of the seal pattern 516.

The seal dispenser for fabricating a liquid crystal display panel and the method for detecting a discontinuous portion of a seal pattern using the dispenser according to the second embodiment of the present invention will now be explained as follows.

First, the table 510 is horizontally moved in forward/backward and left/right directions to align the image camera 520 to the start point of the seal pattern 516, and then the table 510 is horizontally moved again in the forward/backward and left/right directions to detect an image of the seal pattern 516 formed on the substrate 500 by the image camera 520.

Thus, the table 510 with the loaded substrate 400 is moved in the same path as the seal pattern 516 is formed through the syringe 401 and an image of the seal pattern 516 is detected by the image camera 520. The image of the seal pattern 516 detected by the image camera 520 is enlarged to be displayed by the display unit 521. Then, the operator can check whether the seal pattern 416 has a discontinuous portion by investigating the enlarged image of the seal pattern 516.

Comparing to the first embodiment, the seal dispenser for fabricating a liquid crystal display panel according to the second embodiment of the present invention additionally includes the first memory unit 530 for receiving and storing the reference line width data of the seal pattern 516 from the operator, a second memory unit 531 for receiving and storing the actual line width data of the seal pattern 516 detected by the image camera 520, a comparing unit 540 for comparing the data stored in the first and second memory units 530 and 531 and outputting a control signal if an error exceeds a tolerance limit, and an alarm driving unit 550 for generating an alarm upon receiving the control signal of the comparing unit 540.

The first memory unit 530 receives and stores the reference line width data of the seal pattern 516 from the operator, and the second memory unit 531 receives and stored the actual line width data of the seal pattern 516 detected by the image camera 520.

The comparing unit 540 compares the reference line width data and the actual line width data of the seal pattern 516 respectively stored in the first and second memory units 530 and 531 and outputs a control signal if its error exceeds a tolerance limit.

The alarm driving unit 550 generates an alarm if the control signal of the comparing unit 540 is inputted thereto.

Accordingly, similar to the first embodiment of the present invention, the image of the seal pattern 516 detected by the image camera 520 is enlarged to be displayed by the display unit 521, so that the operator can precisely detect whether the seal pattern 516 has a discontinuous portion by investigating the enlarged image.

In particular, in the second embodiment of the present invention, even if the operator fails to check the seal pattern 516 through the display unit 521 from inadvertence or due to other works, the alarm driving unit 550 detects a discontinuous portion of the seal pattern 516 and generates an alarm accordingly. Thus, the detection reliability is improved and the degree of freedom for an operator can also be improved.

The seal pattern 516 may be formed in various shapes depending on the method of forming a liquid crystal layer on the liquid crystal display panel similar to the first embodiment of the present invention.

Accordingly, in case of applying the vacuum injection method, a portion of the seal pattern 516 is open so that it functions as a liquid crystal injection hole, while the seal pattern 516 should be formed to have a rectangular shape encompassing the outer edge of the image display region in the dropping method.

Figure 8:
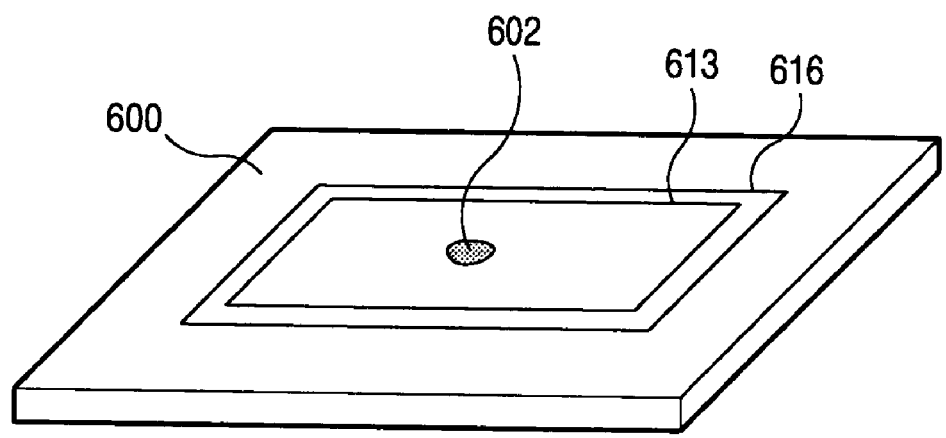
FIG. 8 illustrates a seal pattern shape in forming a liquid crystal layer by a dropping method.

FIG. 8 illustrates a seal pattern shape of forming a liquid crystal layer by a dropping method.

As shown in FIG. 8, a seal pattern 616 in a rectangular shape is formed to encompass the outer edge of the image display part 613 of a substrate 600, and liquid crystal 602 is dropped within the image display part 613. The liquid crystal 602 is dropped at the central portion of the image display part 613, so that a drop region and a drop amount of the liquid crystal need to be controlled so as to be uniformly distributed within the image display part 613 of the substrate 600 in the later process of attaching the liquid crystal display panel.

The seal pattern 616 in a rectangular shape encompassing the outer edge of the image display part 613 is hardened so that the liquid crystal 602 dropped within the image display part 613 of the substrate 600 may not leak in the later process of attaching the liquid crystal display panel.

Meanwhile, in case of forming the seal pattern 616 with a thermo-hardening sealant, the liquid crystal 602 may be contaminated while the sealant is heated in the later process of hardening the seal pattern 616 and attaching the liquid crystal display panel. Thus, for the seal pattern 616, an ultraviolet-hardening sealant may be applied, or a mixture of the ultraviolet-hardening sealant and the thermo-hardening sealant may be applied.

The seal pattern 616 in a rectangular shape encompassing the outer edge of the image display part 613 is formed in a closed pattern by making the start point and the end point to meet each other by using the seal dispenser according to the present invention.

However, since the sealant used in fabricating the liquid crystal display panel has a high viscosity, it is coagulated at the end of the nozzle of the seal dispenser, resulting in that the sealant is excessively distributed at the start point of the seal pattern 616.

The excessively distributed sealant can be spread to the interior or the exterior of the image display part 613 of the substrate 600 due to the pressure caused in the later process of attaching the liquid crystal display panel.

The sealant spread to the interior of the image display part 613 may contaminate the liquid crystal 602, while the sealant spread to the exterior of the image display part 613 may infiltrate into the cut line of the unit liquid crystal display panels formed on the large-scale mother substrate, interfering the later cutting process of the liquid crystal display panel.

Thus, considering those problems caused by the seal pattern 616 in a rectangular shape, the start point of the seal pattern 616 may be formed from a dummy region of the substrate 600.

Figure 9:
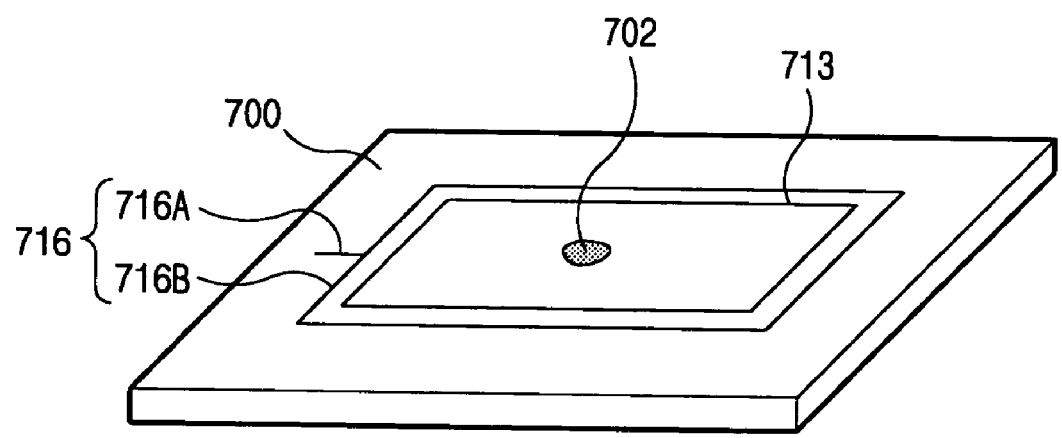
FIG. 9 illustrates another seal pattern shape in forming a liquid crystal layer by a dropping method.

FIG. 9 illustrates another seal pattern shape of forming a liquid crystal layer by a dropping method.

As shown in FIG. 9, a seal pattern 716 is formed encompassing the outer edge of an image display part 713 of a substrate 700, and liquid crystal 702 is dropped within the image display part 713.

The seal pattern 716 can be divided into a first seal pattern 716A formed with a certain length from a dummy region of the substrate 700 where the image display part 713 is not formed to the outer edge of the image display part 713, and a second seal pattern 716B connected to the first seal pattern 716A and having a rectangular shape encompassing the outer edge of the image display part 713.

The liquid crystal 702 is dropped at the central portion of the image display part 713, but the drop region and the drop amount should be controlled so as to be uniformly distributed within the image display part 713 of the substrate 700 in the later process of attaching the liquid crystal display panel.

The first seal pattern 716A, formed to prevent a problem caused by the sealant coagulation at the end of the nozzle of the seal dispenser in case of forming the seal pattern 616 in the rectangular shape of which the start point and the end point meet, may be formed at any place of the dummy region of the substrate 700. In order to complete the seal pattern 716, the first seal pattern 716A should be formed first, and then the second seal pattern 716B is formed later.

The second seal pattern 716B in the rectangular shape encompassing the outer edge of the image display part 713 has the same shape as that of the seal pattern 616 in the rectangular shape as described above.

Thus, the second seal pattern 716B in the rectangular shape encompassing the outer edge of the image display part 713 can prevent a leakage of the liquid crystal 702 dropped within the image display part 713 of the substrate 700 in the later process of attaching the liquid crystal display panel.

Meanwhile, in case of forming the seal pattern 716 with a thermo-hardening sealant, the liquid crystal 702 may be contaminated by the sealant as the sealant flows out while being heated in the later process of attaching the liquid crystal display panel. Thus, for the seal pattern 716, the ultraviolet-hardening sealant may be used, or a mixture of the ultraviolet-hardening sealant and the thermo-hardening sealant may be also used.

As described above, the seal dispenser for fabricating a liquid crystal display panel and the method for detecting a discontinuous portion of a seal pattern using the same according to the present invention have the following advantages.

The seal pattern is formed on the substrate, and the image is detected along the path of forming the seal pattern by the image camera and enlarged to be displayed by the display unit. Accordingly, the seal pattern having a discontinuous portion can be precisely detected.

In addition, since the equipment is not opened and an undesirable material is not generated and not adsorbed on the substrate, the productivity can be improved in the present invention.

Moreover, since the image of the seal pattern is enlarged to be displayed on the display unit, the seal pattern having a discontinuous portion can be previously checked within a short period of time.

Thus, an inspection time can be reduced, thereby improving the productivity of products and the reliability of inspection. As a result, in a later process, the yield can be much improved in the present invention.

It will be apparent to those skilled in the art that various modifications and variations can be made in the seal dispenser for fabricating liquid crystal display panel and the method for detecting a discontinuous portion of seal pattern using the same of the present invention without departing from the spirit or scope of the inventions. Thus, it is intended that the present invention covers the modifications and variations of this invention provided they come within the scope of the appended claims and their equivalents.

What is claimed is:

1. A seal dispenser for fabricating a liquid crystal display panel, comprising:
    a table holding a substrate;
    a syringe forming a seal pattern on the substrate by varying a position of the table, wherein the seal pattern defines a plurality of image display parts on the substrate;
    an image camera detecting an image of the seal pattern by varying the position of the table;
    a display unit displaying an image of the seal pattern detected by the image camera; and
    a control unit determining a line width of the seal pattern detected by the image camera, comparing the line width with a predetermined value and generating a control signal when a difference between the line width and the predetermined value exceeds a tolerance limit.

2. The seal dispenser of claim 1, wherein the substrate has at least one thin film transistor array substrate formed thereon.

3. The seal dispenser of claim 1, wherein the substrate has at least one color filter substrate formed thereon.

4. The seal dispenser of claim 1, wherein the image camera is coupled to the syringe.

5. The seal dispenser of claim 1, wherein at least one of the table and the syringe is capable of moving horizontally.

6. The seal dispenser of claim 1, wherein the table is capable of moving horizontally in forward/backward and left/right directions.

7. The seal dispenser of claim 6, wherein the table is driven with the same path as those for forming the seal pattern and detecting the image of the seal pattern.

8. The seal dispenser of claim 1, wherein the seal pattern has an open portion.

9. The seal dispenser of claim 1, wherein the seal pattern has a rectangular shape encompassing an outer edge of an image display region of the liquid crystal display panel.

10. The seal dispenser of claim 1, wherein the seal pattern is formed of an ultraviolet-hardening sealant.

11. The seal dispenser of claim 1, wherein the seal pattern is formed of an ultraviolet-hardening sealant and a thermo-hardening sealant.

12. A seal dispenser, comprising:
    a table holding a substrate;
    a syringe forming a seal pattern on the substrate by varying a position of the table;
    an image camera detecting an image of the seal pattern by varying the position of the table; and
    a display unit displaying an image of the seal pattern detected by the image camera;
    wherein the seal pattern comprises:
    a first seal pattern formed at a dummy region of the substrate where an image display region is not formed; and a second seal pattern connected to the first seal pattern and encompassing an outer edge of the image display region.

13. A seal dispenser, comprising:

a table holding a substrate;

a syringe forming a seal pattern on the substrate by varying a position of the table;

an image camera detecting an image of the seal pattern by varying the position of the table;

a display unit displaying an image of the seal pattern detected by the image camera;

a first memory unit receiving and storing data for a reference line width of the seal pattern;

a second memory unit receiving and storing data for a measured line width of the seal pattern detected by the image camera;

a comparing unit comparing the data stored in the first and second memory units and outputting a control signal when an error exceeds a tolerance limit; and an alarm driving unit generating an alarm upon receiving the control signal of the comparing unit.

14. A method for detecting a discontinuous portion of a seal pattern of a liquid crystal display panel, comprising:

loading a substrate;

forming a seal pattern on the substrate by varying a relative position between the substrate and a syringe, wherein the seal pattern defines a plurality of image display parts on the substrate;

aligning a start point of the seal pattern and an image camera;

detecting an image of the seal pattern by changing the relative position between the image camera and the substrate, wherein the image camera detects the seal pattern through the same moving path as that of the syringe;

displaying the image of the seal pattern; and determining whether the seal pattern has a discontinuous portion by investigating a line width of the seal pattern detected by the image camera and comparing the line width with a predetermined value.

15. The method of claim 14, wherein the image of the seal pattern is enlarged for being displayed.

16. A method for detecting a discontinuous portion of a seal pattern of a liquid crystal display panel, comprising:

loading a substrate;

forming a seal pattern on the substrate by varying a relative position between the substrate and a syringe;

aligning a start point of the seal pattern and an image camera;

detecting an image of the seal pattern by changing the relative position between the image camera and the substrate;

displaying the image of the seal pattern;

determining whether the seal pattern has a discontinuous portion by investigating the displayed image of the seal pattern;

receiving and storing data for a reference line width of the seal pattern;

receiving and storing data for a measured line width of the seal pattern;

comparing the data for the reference line width and the data for the measured line width and determining whether an error exceeds a tolerance limit; and generating an alarm when the error exceeds the tolerance limit.

* * * * *